United States Patent [19]
Gregg et al.

[11] Patent Number: 5,571,436
[45] Date of Patent: *Nov. 5, 1996

[54] INDUCTION HEATING OF COMPOSITE MATERIALS

[75] Inventors: Paul S. Gregg; Marc R. Matsen, both of Seattle, Wash.

[73] Assignee: The Boeing Company, Seattle, Wash.

[*] Notice: The term of this patent shall not extend beyond the expiration date of Pat. No. 5,410,132.

[21] Appl. No.: 423,549

[22] Filed: Apr. 17, 1995

Related U.S. Application Data

[63] Continuation of Ser. No. 777,739, Oct. 15, 1991, Pat. No. 5,410,132.

[51] Int. Cl.$^6$ ................................................. B23K 13/01
[52] U.S. Cl. ........................... 219/604; 219/600; 219/602; 219/635
[58] Field of Search .................................. 219/602, 604, 219/600, 633, 635, 645, 647, 649; 228/157, 265; 72/54, 60, 38, 709, 342

[56] References Cited

U.S. PATENT DOCUMENTS

| | | |
|---|---|---|
| 2,241,312 | 5/1941 | Luty . |
| 2,273,423 | 2/1942 | Somes . |
| 2,372,929 | 4/1945 | Blessing . |
| 2,423,922 | 7/1947 | Arndt, Jr. . |
| 2,589,777 | 3/1952 | Collins . |
| 2,739,829 | 3/1956 | Pedlow et al. . |
| 2,761,941 | 9/1956 | Ardichvili . |
| 2,898,435 | 8/1959 | Crafts . |
| 2,984,732 | 5/1961 | Herbert . |
| 3,101,403 | 8/1963 | Lewis et al. . |
| 3,110,961 | 11/1963 | Melill et al. . |
| 3,183,460 | 5/1965 | Bennon . |
| 3,288,979 | 11/1966 | Mills et al. . |
| 3,395,261 | 7/1968 | Leatherman et al. . |
| 3,431,379 | 4/1969 | Yrene . |
| 3,444,275 | 5/1969 | Willett . |
| 3,450,856 | 6/1969 | Buck et al. . |
| 3,492,453 | 1/1970 | Hurst . |
| 3,507,735 | 4/1970 | Chisholm . |
| 3,529,458 | 9/1970 | Butler et al. . |
| 3,574,031 | 4/1971 | Heller, Jr. et al. . |
| 3,595,060 | 7/1971 | Hundy . |
| 3,605,477 | 9/1971 | Carlson . |
| 3,661,491 | 5/1972 | Troyer . |
| 3,705,284 | 12/1972 | Binard . |

(List continued on next page.)

FOREIGN PATENT DOCUMENTS

| | | |
|---|---|---|
| 0461979B1 | 4/1994 | European Pat. Off. . |
| 54-25542 | 2/1979 | Japan . |
| 1418327 | 12/1975 | United Kingdom . |

OTHER PUBLICATIONS

J. Giachino, Welding Skills and Practices, Am. Tech. Soc., Chicago, IL (1960, 1965, 1967, 1971, 1976) 393–401.

*Primary Examiner*—Tu Hoang
*Attorney, Agent, or Firm*—Christensen O'Connor Johnson & Kindness PLLC

[57] ABSTRACT

Apparatus and method for superplastic forming. The workpiece is held between a pair of dies that are electrically and thermally nonconductive, and is heated inductively by a coil embedded within the dies. The dies are formed of a material that is substantially transparent to inductive heating. A plurality of electrical conductors are embedded within the die. The electrical conductors are interconnected into one or more electrically conductive coils that surround the workpiece. The electrical conductors are used to produce a time varying magnetic field that is used to heat the workpiece. In one embodiment, the workpiece is a composite material that is susceptible to inductive heating. The composite material includes an electrically conductive material. The time varying magnetic field heats the electrical conductive material, thereby heating the workpiece. The die also includes a forming surface having a shape corresponding to a desired shape of the workpiece. A pressure differential is created between the first and second sides of the workpiece to deform the workpiece to the shape of the forming surface.

19 Claims, 4 Drawing Sheets

U.S. PATENT DOCUMENTS

| | | |
|---|---|---|
| 3,845,268 | 10/1974 | Sindt . |
| 3,864,186 | 2/1975 | Balla . |
| 3,890,819 | 6/1975 | DeLuca . |
| 3,920,175 | 11/1975 | Hamilton et al. . |
| 3,927,817 | 12/1975 | Hamilton et al. . |
| 3,934,441 | 1/1976 | Hamilton et al. . |
| 3,941,643 | 3/1976 | Balla . |
| 3,946,349 | 3/1976 | Haldeman, III . |
| 3,974,673 | 8/1976 | Fosness et al. . |
| 3,996,402 | 12/1976 | Sindt . |
| 4,005,302 | 1/1977 | Graf et al. . |
| 4,029,837 | 6/1977 | Leatherman . |
| 4,029,926 | 6/1977 | Austin . |
| 4,060,364 | 11/1977 | Gras . |
| 4,091,254 | 5/1978 | Struve . |
| 4,111,024 | 9/1978 | Dahlman et al. . |
| 4,117,970 | 10/1978 | Hamilton et al. . |
| 4,120,712 | 10/1978 | Sindt . |
| 4,141,484 | 2/1979 | Hamilton et al. . |
| 4,145,903 | 3/1979 | Leach et al. . |
| 4,150,927 | 4/1979 | Steingroever . |
| 4,180,717 | 12/1979 | Lenk et al. . |
| 4,188,811 | 2/1980 | Brimm . |
| 4,217,397 | 8/1980 | Hayase et al. . |
| 4,233,829 | 11/1980 | Hamilton et al. . |
| 4,233,831 | 11/1980 | Hamilton et al. . |
| 4,269,053 | 5/1981 | Agrawal et al. . |
| 4,292,375 | 9/1981 | Ko . |
| 4,296,295 | 10/1981 | Kiuchi . |
| 4,304,821 | 12/1981 | Hayase et al. . |
| 4,304,975 | 12/1981 | Lenk et al. . |
| 4,306,436 | 12/1981 | Schulz et al. . |
| 4,313,777 | 2/1982 | Buckley et al. . |
| 4,331,284 | 5/1982 | Schulz et al. . |
| 4,343,982 | 8/1982 | Schwartz et al. . |
| 4,352,280 | 10/1982 | Ghosh . |
| 4,355,222 | 10/1982 | Geithman et al. . |
| 4,382,113 | 5/1983 | Schwartz et al. . |
| 4,393,987 | 7/1983 | Anderson et al. . |
| 4,416,713 | 11/1983 | Brooks . |
| 4,421,588 | 12/1983 | Davies . |
| 4,445,951 | 5/1984 | Lind et al. . |
| 4,474,044 | 10/1984 | Leistner et al. . |
| 4,521,659 | 6/1985 | Buckley et al. . |
| 4,524,037 | 6/1985 | Marc . |
| 4,530,197 | 7/1985 | Rainville . |
| 4,544,339 | 10/1985 | Itoh . |
| 4,555,373 | 11/1985 | Bloemkolk et al. . |
| 4,563,145 | 1/1986 | de Meij . |
| 4,584,860 | 4/1986 | Leonard . |
| 4,603,089 | 7/1986 | Bampton . |
| 4,603,808 | 8/1986 | Stacher . |
| 4,622,445 | 11/1986 | Matsen . |
| 4,635,461 | 1/1987 | Raymond . |
| 4,649,249 | 3/1987 | Odor . |
| 4,653,396 | 3/1987 | Wennerberg . |
| 4,657,717 | 4/1987 | Cattanach et al. . |
| 4,673,450 | 6/1987 | Burke . |
| 4,706,361 | 11/1987 | Meyer et al. . |
| 4,713,953 | 12/1987 | Yavari . |
| 4,716,072 | 12/1987 | Kim . |
| 4,768,433 | 9/1988 | Boissevain . |
| 4,822,972 | 4/1989 | Sugioka et al. . |
| 4,824,617 | 4/1989 | Takeuchi et al. . |
| 4,855,011 | 8/1989 | Legge et al. . |
| 4,882,823 | 11/1989 | Weisert et al. . |
| 4,888,973 | 12/1989 | Comley . |
| 4,889,276 | 12/1989 | Cadwell et al. . |
| 4,897,518 | 1/1990 | Mucha et al. . |
| 4,901,552 | 2/1990 | Ginty et al. . |
| 4,904,972 | 2/1990 | Mori et al. . |
| 4,906,172 | 3/1990 | Stewart . |
| 4,919,759 | 4/1990 | Ilmarinen et al. . |
| 4,947,464 | 8/1990 | Mori et al. . |
| 4,951,491 | 8/1990 | Lorenz . |
| 4,978,825 | 12/1990 | Schmidt et al. . |
| 4,984,348 | 1/1991 | Cadwell . |
| 4,988,037 | 1/1991 | Cadwell . |
| 5,024,369 | 6/1991 | Froes et al. . |
| 5,032,327 | 7/1991 | Becheret . |
| 5,047,605 | 9/1991 | Ogden . |
| 5,064,978 | 11/1991 | Scholz . |
| 5,074,019 | 12/1991 | Link . |
| 5,079,817 | 1/1992 | Anstotz et al. . |
| 5,093,545 | 3/1992 | McGaffigan . |
| 5,101,086 | 3/1992 | Dion et al. . |
| 5,115,963 | 5/1992 | Yasui . |
| 5,118,026 | 6/1992 | Stacher . |
| 5,139,407 | 8/1992 | Kim et al. . |
| 5,141,146 | 8/1992 | Yasui . |
| 5,199,791 | 4/1993 | Kasanami et al. . |
| 5,229,562 | 7/1993 | Burnett et al. . |
| 5,250,776 | 10/1993 | Pfaffmann . |
| 5,410,132 | 4/1995 | Gregg et al. ............................ 219/604 |

INDUCTION HEATING OF COMPOSITE MATERIALS

This is a continuation of the prior application Ser. No. 07/777,739, filed Oct. 15, 1991, now U.S. Pat. No. 5,410, 132 the benefit of the filing date of which is hereby claimed under 35 U.S.C. §120.

FIELD OF THE INVENTION

The present invention relates to superplastic forming of workpieces.

BACKGROUND OF THE INVENTION

Under certain conditions, some materials can be plastically deformed without rupture well beyond their normal limits, a property called superplasticity. This property is exhibited by certain metals and alloys, within limited ranges of temperature and strain rate. For example, titanium and its alloys are superplastic in the temperature range 1450°–1850° F.

Superplastic forming (SPF) is a fabrication technique that relies on superplasticity. A typical SPF process involves placing a sheet of metal in a die, heating the sheet to an elevated temperature at which it exhibits superplasticity, and then using a gas to apply pressure to one side of the sheet. The pressure stretches the sheet and causes it to assume the shape of the die surface. The pressure is selected to strain the material at a strain rate that is within its superplasticity range at the elevated temperature.

One advantage of SPF is that very complex shapes can be readily formed. In addition, the SPF process is generally applicable to single and multi-sheet fabrication, and can be combined with joining processes such as diffusion bonding to produce complex sandwich structures at a relatively low cost. The simplicity of the SPF process leads to lighter and less expensive parts with fewer fasteners, and higher potential geometric complexity. Common applications of SPF include the manufacturing of parts for aircraft, missiles and space vehicles.

In a typical prior art SPF process for titanium, a titanium sheet is placed between steel dies, one of which has a contoured surface corresponding to the shape to be imparted to the titanium sheet. The dies are then placed on platens or plates which are heated through the use of electrical resistance type heating elements embedded within the platens. The platens heat the dies through conduction heating to about 1650° F. To avoid oxidation of the titanium at the elevated temperature, the sheet is immersed in an inert atmosphere such as argon gas. The dies conduct heat into the titanium until its temperature reaches the superplastic range. At that time, the pressure of the argon gas on the side of the sheet away from the contoured surface is elevated sufficiently to deform the titanium sheet against the contoured surface, whereupon the sheet acquires the shape of the surface.

The high temperature at which the SPF operation must be carried out causes it to be a slow and cumbersome process. In particular, because of their large thermal mass, the dies are .typically maintained at forming temperature throughout a production run. Failure to maintain the dies at superplastic forming temperatures during part loading and unloading would result in unacceptable process times for each part. Thus, blank sheets must be inserted, and formed parts removed, while the SPF dies are at forming temperature. Because the parts are loaded and unloaded from the dies while still at forming temperature, the parts must be very carefully handled in order to minimize bending of the part. Even with careful handling, some parts may be distorted during unloading and require subsequent processing steps to achieve proper part tolerances. Furthermore, the elevated temperature of the forming dies and parts requires operators to wear protective clothing and use special equipment to insert the metal sheets between the dies, and particularly to remove the formed parts.

SUMMARY OF THE INVENTION

The present invention provides an improved apparatus and method for superplastic forming.

A preferred apparatus according to the invention comprises a die having a nonmetallic forming surface that has a shape corresponding to the desired shape for the workpiece. Means are provided for positioning the workpiece such that it overlies the forming surface, with a first side of the workpiece facing the forming surface. Inductive heating means are provided for subjecting the workpiece to a time varying magnetic field, such that the workpiece is heated to a temperature at which it is superplastic. Finally, means are provided for producing a pressure differential between the first and second sides of the workpiece, while the workpiece is at said temperature, such that the workpiece deforms and assumes the shape of the forming surface.

The dies are preferably formed from a dielectric, thermally insulating material such as a castable ceramic. Thermal energy is therefore applied to the workpiece but not the dies, leading to much shorter heating and cooling cycles as compared to the prior art technique of using resistance-type heating with metal dies. The inductive heating means of the invention preferably comprises a plurality of electrical conductors embedded within the dies, and means for interconnecting such conductors into a coil that surrounds the workpiece.

One embodiment of the invention is an apparatus for heating a workpiece formed of a composite material susceptible to inductive heating. The apparatus includes a die formed of a material substantially transparent to the transmission of an inductive magnetic field. The die also includes a forming surface on which the workpiece is placed. An inductive heater is located within the die and subjects an electrically conductive material in the composite material to an alternating magnetic field. The alternating magnetic field heats the electrically conductive material in the composite material, thereby heating the workpiece.

In accordance with other features of the invention, the apparatus includes a plurality of electrical conductors embedded within the die. The electrical conductors are interconnected into one or more electrically conductive coils that surround the workpiece. The apparatus also includes means for producing a pressure differential between the sides of the workpiece in order to deform the workpiece to the forming surface of the die.

DETAILED DESCRIPTION OF THE PREFERRED EMBODIMENT

Figure 1:
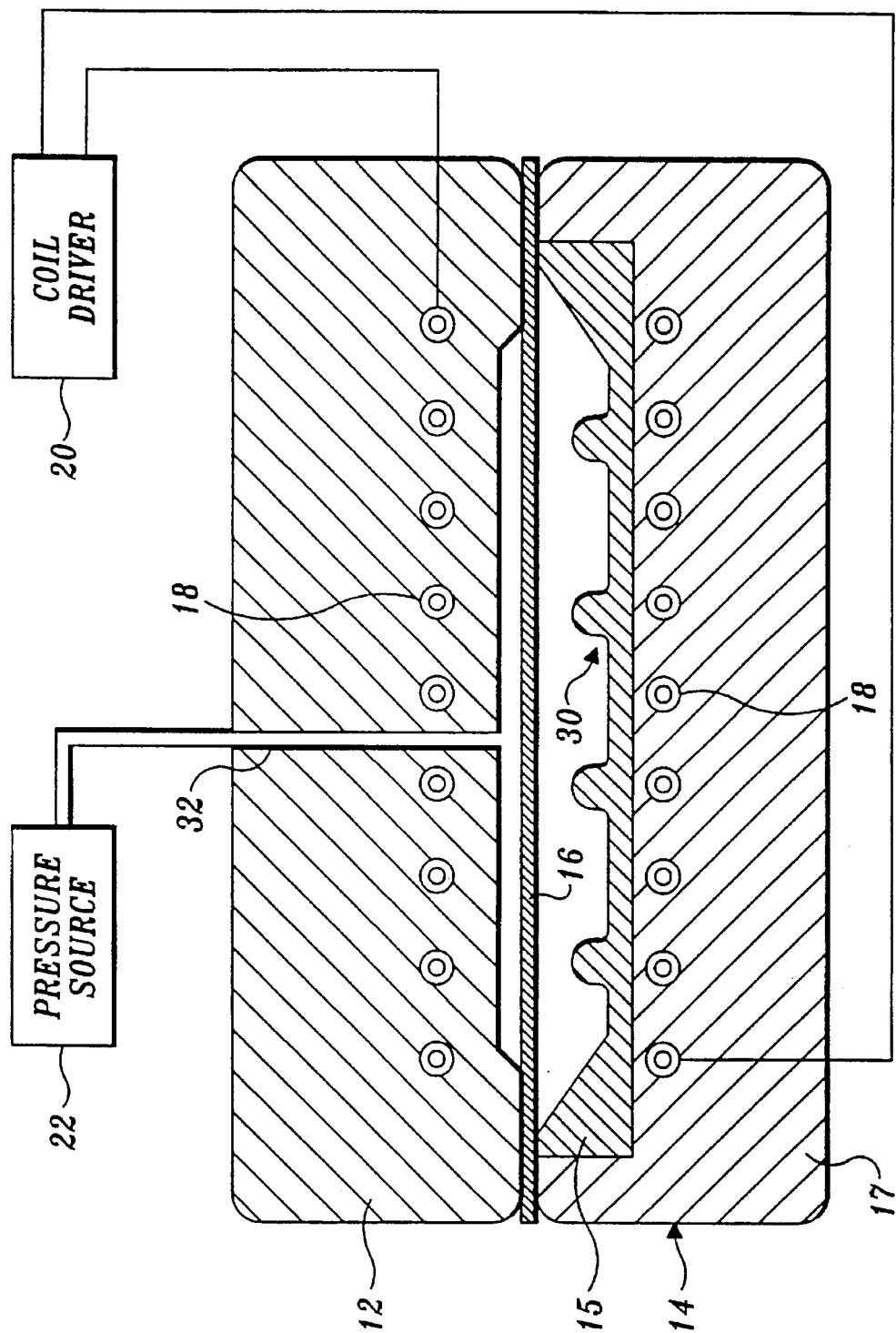
FIG. 1 is a schematic diagram of an apparatus for performing superplastic forming according to the present invention.

FIG. 1 schematically illustrates a preferred embodiment of a superplastic forming apparatus according to the present invention. The apparatus includes a pair of dies 12 and 14 between which a workpiece 16 may be positioned. Both dies are preferably formed from a dielectric, thermally insulating material, such as ceramic. A plurality of metallic tubing sections 18 are embedded within the upper and lower dies, and interconnected to one another to form a single coil, as further described below. The apparatus also includes coil driver 20 connected to two of the tubing sections 18, and pressure source 22. The apparatus may also include means (not shown) for pumping a cooling fluid through tubing sections 18.

Lower die 14 includes a tool box 17 and a tool insert 15. The tool insert 15 has a forming surface 30 that has a shape corresponding to the desired shape for workpiece 16. The tool insert 15 and tool box 17 are preferably formed from a dielectric, thermally insulating material such as ceramic. Tool insert 15 and tool box 17 can be separate pieces as shown in FIG. 1 or they can be a single integral part. The two piece design shown in FIG. 1 reduces cost by allowing different tool inserts 15 to be interchangeably used within the tool box 17.

Figure 2:
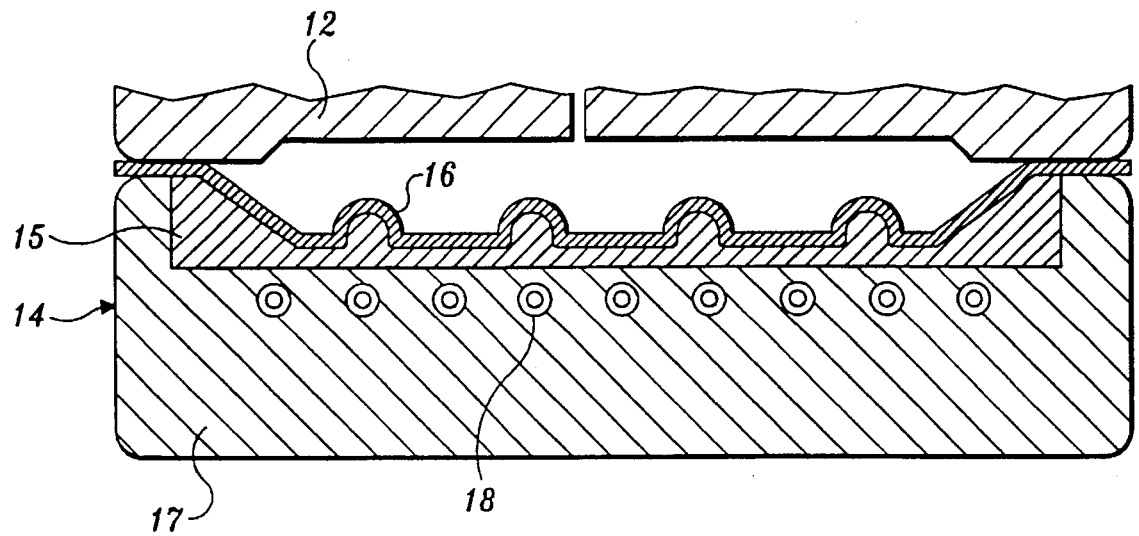
FIG. 2 is a schematic view illustrating the deformation of the workpiece.

In operation, coil driver 20 energizes the coil formed by sections 18, such that workpiece 16 is inductively heated. When the workpiece reaches a temperature at which it is superplastic, pressure is applied to the upper surface of the workpiece from pressure source 22 via conduit 32 that passes through upper die 12. Suitable pressures vary depending upon the workpiece, with pressures in the range 50–600 psi being typical. In response to the pressure, the workpiece deforms until it assumes the shape of forming surface 30, as illustrated in FIG. 2. Small pinholes (not shown) may be formed in the tool insert 15 and tool box 17 to allow the venting of gas trapped between the workpiece and the forming surface as deformation proceeds. Such pinholes are often coupled to a flow meter to monitor the progress of deformation. When the workpiece has the desired shape, the coil is de-energized, and the pressure source removed. The dies may then be separated to remove the formed workpiece.

One of the key concepts of the present invention is the use of inductive rather than resistive heating to heat the workpiece. Inductive heating is accomplished by applying an alternating electrical current to the coil within which the workpiece is positioned, to thereby produce an alternating magnetic field in the vicinity of the coil. The alternating magnetic field heats the metallic workpiece via eddy current heating. However the dies are constructed from a dielectric material that is not heated by the time varying magnetic field. Furthermore, the material from which the dies are constructed is also thermally insulating, so that it traps and contains the heat transferred to the workpiece. Other desirable properties for the dies are a low coefficient of thermal expansion, good thermal shock resistance, and relatively high compressive strength. The preferred die materials are castable ceramics, and particularly fused silica castable ceramics.

Figure 3:
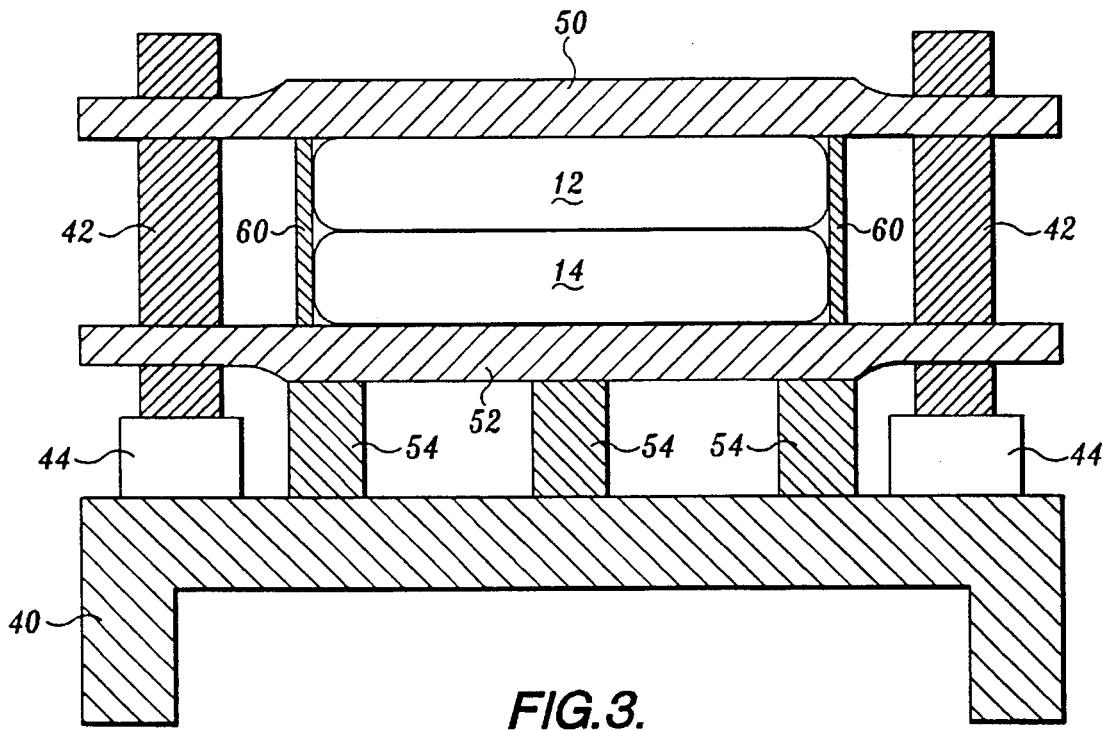
FIG. 3 is a schematic view illustrating the support for the dies.

FIG. 3 illustrates a suitable support structure for the apparatus shown in FIGS. 1 and 2. The support structure includes base 40 from which threaded shafts 42 extend upwardly from gear boxes 44 which rotate the threaded shafts 42. Dies 12 and 14 are supported above and below by metal strongbacks 50 and 52, respectively. Strongback 52 loosely receives shafts 42, and rests upon reinforcing bars 54. Upper strongback 50 is threadably supported on shafts 42, such that the position of upper strongback 50 can be varied vertically by rotation of the shafts, to thereby open or close the dies. Each strongback consists of a metal structure whose purpose is to provide a stiff, flat surface backing the ceramic die, to transfer the load between the die and the support structure. The strongback must be flat and stiff enough to prevent the ceramic die from bending and cracking. Preferably, the strongback should be capable of holding the ceramic die to a surface tolerance of +/−0.003 inches per square foot of die surface. Because relatively little of the magnetic field is produced outside the coil, the strongback remains substantially at room temperature during the SPF process, despite its metallic construction.

Dies 12 and 14 are supported laterally by box 60 that encloses the dies on all sides. Box 60 is preferably formed from a dielectric material, so that it will not be heated by any inductive field that extends outside the dies. A suitable material for box 60 is a phenolic resin. The phenolic box may further be connected with preloaded tie rods, in a manner similar to prestressed concrete, or an external load fixture may be used to push against the phenolic box. Utilizing either method, the phenolic box sides function as pressure plates that maintain compressive forces on the ceramic dies. When the dies are formed from a castable ceramic material, the phenolic box may also provide the sidewalls of the mold for casting the dies.

Figure 4:
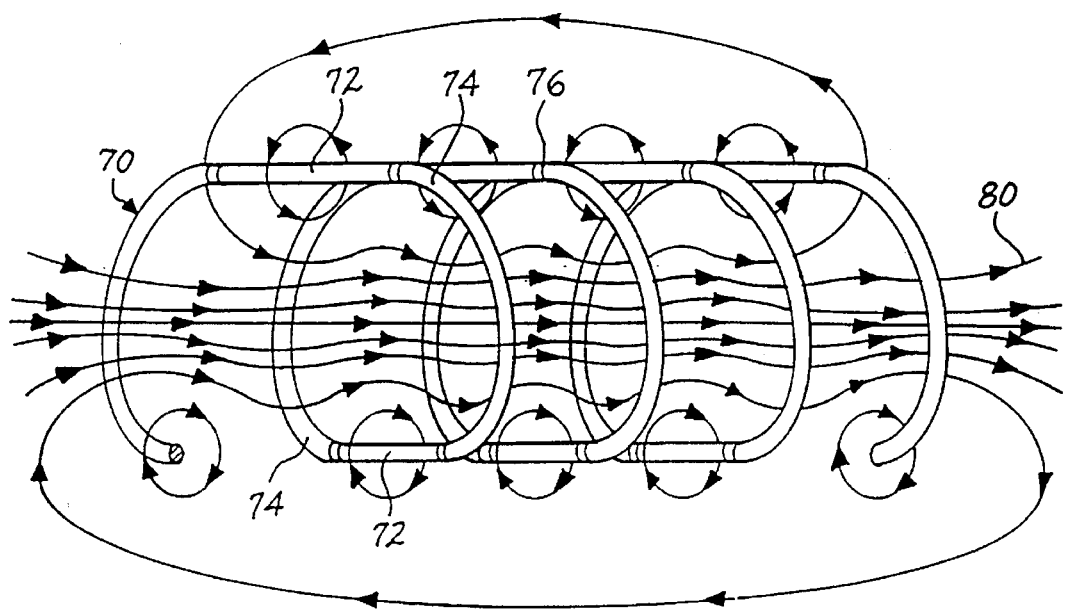
FIG. 4 is a perspective view illustrating the induction coil.
Figure 5:
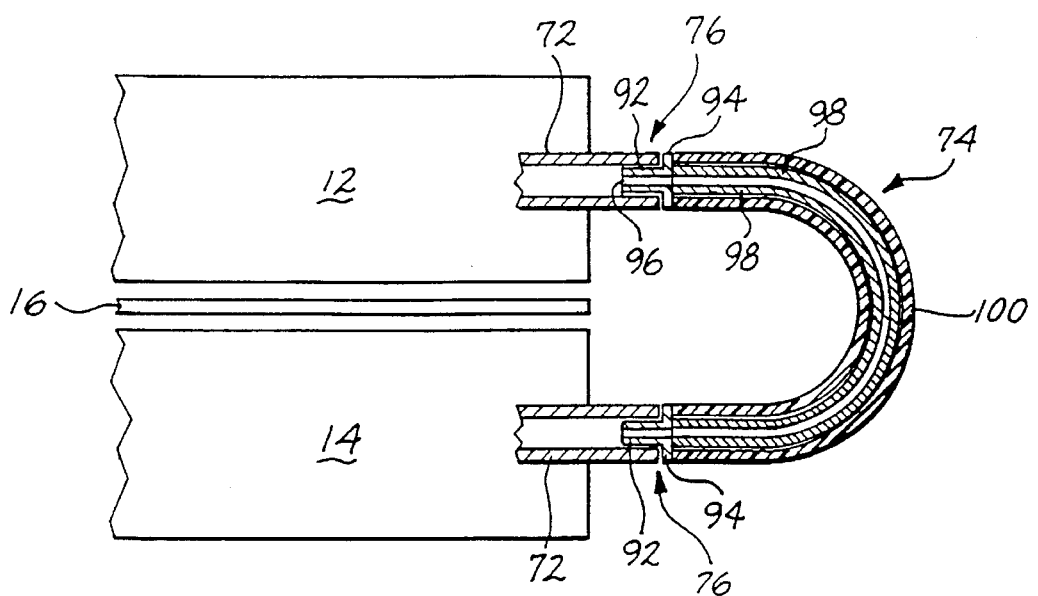
FIG. 5 is a cross-sectional view of a flexible coil connector.

FIGS. 4 and 5 illustrate a preferred method for interconnecting tubing sections 18 (FIG. 1) into a single coil. Referring initially to FIG. 4, coil 70 comprises straight sections 72 and curved sections 74. Each straight section 72 is cast into one of the dies, while each curved section 74 extends between the upper and lower die, as illustrated in FIG. 5. The curved sections are flexible, as further described below, to accommodate the opening and closing of the dies. The curved and straight sections are joined at fittings 76 into a continuous coil or helix structure, producing a magnetic field schematically illustrated by field lines 80 in FIG. 4. By applying a time varying current to coil 70, a time varying magnetic field 80 is created that heats the metal workpiece via eddy current heating. Each straight section 72 and curved section 74 preferably comprises a copper tube having an interior longitudinal passage through which a cooling fluid such as water may be pumped to cool the tubing sections themselves.

FIG. 5 illustrates a preferred construction for curved section 74. The curved section comprises a pair of fittings 76, each of which contains a relatively small diameter section 92 dimensioned so as to fit snugly within straight section 72, and a larger diameter flange 94. Passages 96 extend through the fittings, including the flange. A pair of flexible copper strips 98 are joined between flanges 94, such as by brazing. Finally, a flexible jacket 100 is secured over the copper strips between the flanges to contain the cooling fluid. The jacket preferably comprises a flexible, non-conducting material capable of holding (for example) 80 psi at 140° F. A suitable design utilizes four copper strips approximately five inches long, 0.75 inches wide, and 0.03 inches thick. Such a connection can accommodate three inches of travel between the dies. One commercial vendor through which a suitable design can be obtained is Flex-Cable.

The frequency at which the coil driver drives the coil depends upon the nature of the workpiece. Current penetration of copper at 3 KHz is approximately 0.06 inches, while the penetration at 10 KHz is approximately 0.03 inches. The shape of the coil used to create the induction heating has a significant effect upon the magnetic field uniformity. This in turn is important because temperature uniformity is directly affected by the uniformity of the magnetic field. Uniform heating in turn means that different portions of the workpiece will reach the appropriate temperature for superplastic forming at the same time. Solenoidal type coils provide such a uniform field, and are therefore preferred. Greater field uniformity is seen by a part which is symmetric about the centerline of the coil. The additions of variations, such as series/parallel coil combinations, variable turn spacings and distances between the part and the coil can be established by standard electrical calculations.

Figure 6:
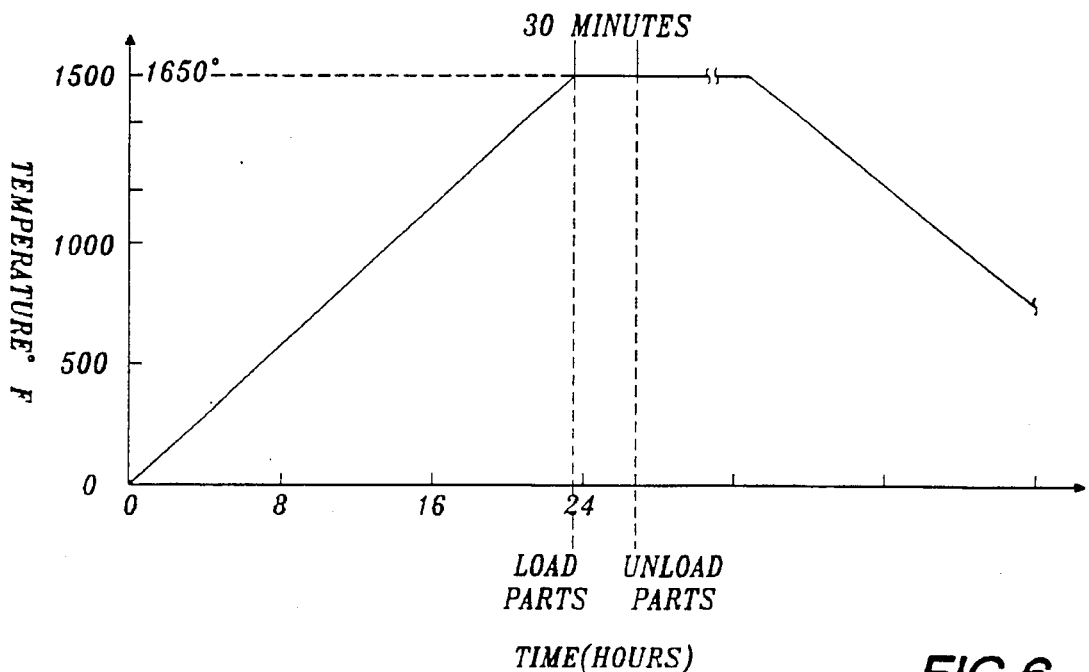
FIG. 6 is a graph illustrating the thermal cycle for SPF with prior art resistive type heating.
Figure 7:
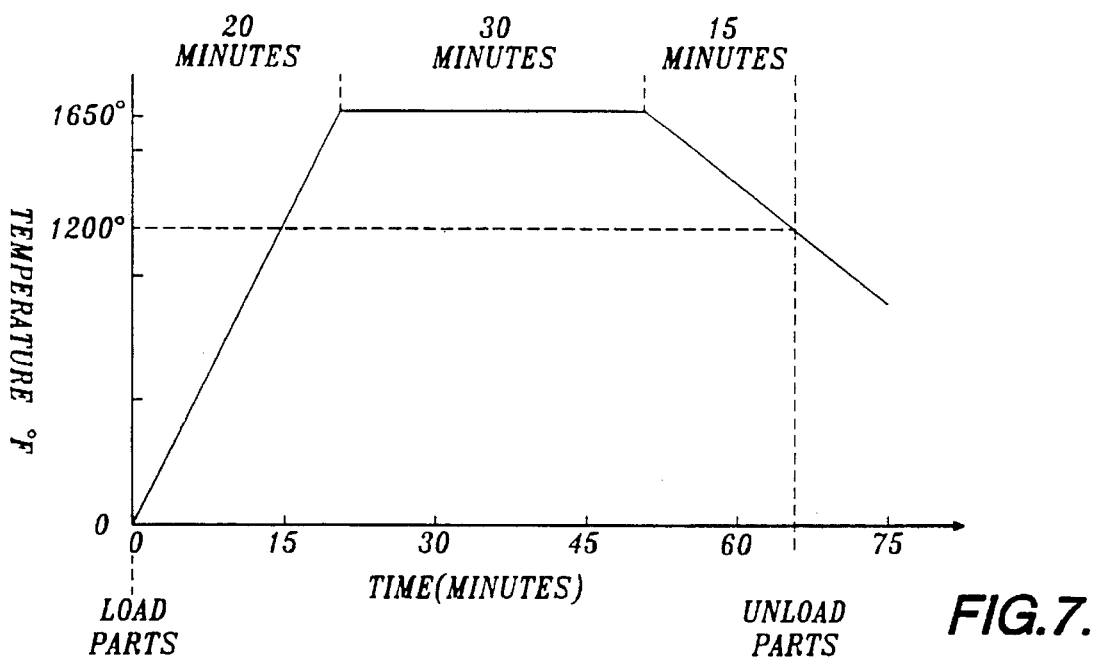
FIG. 7 is a graph illustrating the thermal cycle for SPF utilizing the present invention.

Some advantages of the invention are illustrated by the graphs shown in FIGS. 6 and 7. FIG. 6 illustrates a typical SPF cycle using the prior art technique of resistance heating of the metallic workpiece and dies. The dies are heated to superplastic forming temperatures starting at time 0. Because of the large thermal mass of the thermally conductive metallic dies used in the prior art, the superplastic forming temperature (here 1650° F.) is not attained until about 23 hours later. The workpiece is then loaded into the dies and the superplastic forming operation is carried out, for 30 minutes in this example.

Because of the large times that would be necessary for the metallic dies to cool, the workpiece is removed from the dies while the dies are still at operating temperature. Because the workpiece is still at superplastic forming temperatures, the part must be very carefully unloaded to minimize bending or distortion of the hot part. Even careful removal can result in some distortion of the formed part which must then be further processed in order to obtain proper part tolerances. This increases the costs and complexities in manufacturing.

After removing the workpiece from the dies, a new workpiece may be inserted and superplasticly formed. Upon completion of the production cycle, the metallic dies are then cooled. Because of the large thermal mass of the thermally conductive metallic dies, this cooling process takes a substantial amount of time. During the heating and cooling of the metallic dies used in the prior art, no superplastic forming can take place; therefore, the facility has a large amount of downtime where it is not producing parts.

FIG. 7 provides a comparable graph for the technique of the present invention. Using the invention, a workpiece temperature of 1650° F. may be reached in about 20 minutes, and the workpiece may be formed in about 30 minutes and cooled to 1200° F. in about 15 minutes. Thus the total cycle time is only slightly greater than the one hour. This much shorter time is due to the fact that the workpiece has a much lower thermal mass than the metallic dies used in the prior art. The reduced cycle times of the present invention reduce the downtime involved in a part run.

Because of the short amount of time required to heat and cool the dies used in the present invention, the workpiece temperature can be reduced to approximately 1200° F., without adding significant downtime, before removing the workpiece from the dies. This allows the workpiece to cool to a temperature below the superplastic forming temperature, which reduces the risk of part distortion or damage during the unloading operation.

While the invention has been described in connection with the forming of a single sheet workpiece, it would readily be apparent to those skilled in the art that the process could readily be extended to workpieces that comprise multiple sheets. Generally, in such processes, the gas pressure is applied between pairs of sheets to produce multilayer structures such as rib-stiffened or truss core fuselage structures, stability critical aerosurfaces, beaded shear webs, inlet structures, and other complex shape assemblies. For all such structures, the use of the SPF processes of the present invention will significantly reduce process steps, part counts, and fasteners, resulting in decreased cost, higher reliability, and reduced weight.

Non-metallic materials which are electrically conductive can also be used with the apparatus of the present invention. These materials include composites that contain an electrically conductive material, e.g., graphite fibers. The induction heating process of the present invention induces currents in the electrically conductive fibers within the composite material which result in heating of the fibers and subsequent heating of the entire workpiece.

It will also be apparent to those skilled in the art that the workpiece itself need not comprise a metal or other electrically conductive material. For example, if the workpiece is not conductive, it may be placed in a contact with or bonded to a conductive heating plate that absorbs heat from the inductive field, and transfers it to the workpiece material.

The embodiments of the invention in which an exclusive property or privilege is claimed are defined as follows:

1. An apparatus for heating a workpiece formed of a composite material susceptible to inductive heating, the apparatus comprising:

a die formed of a material substantially transparent to the transmission of an inductive magnetic field, the die having a forming surface on which the workpiece is placed; and an inductive heater, located within the die, that subjects an electrically conductive material in the composite material to an alternating magnetic field to heat the electrically conductive material, thereby heating the workpiece.

2. The apparatus of claim 1, wherein the inductive heater comprises an electrical conductor embedded within the die.

3. The apparatus of claim 2, wherein the inductive heater comprises a plurality of electrical conductors embedded within the die, and means for interconnecting said plurality of electrical conductors into at least one electrically conductive coil surrounding the workpiece.

4. The apparatus of claim 1, wherein the forming surface of the die has a shape corresponding to a desired shape for the workpiece.

5. The apparatus of claim 1 further comprising means for producing a pressure differential between first and second sides of the workpiece to deform the workpiece to the shape of the forming surface.

6. The apparatus of claim 1, further comprising a plate formed of a material that is susceptible to inductive heating located adjacent one surface of the workpiece, and wherein the inductive heater subjects the plate to an alternating magnetic field to heat the plate.

7. The apparatus of claim 1, wherein the die is formed of a castable fused silica ceramic material.

8. The apparatus of claim 1, wherein the die further comprises a tool insert that includes said forming surface and a tool box for holding the tool insert.

9. A method of inductively heating a workpiece formed of a composite material, comprising:

providing a workpiece formed of a nonmetallic composite material containing an electrically conductive material; and inductively heating the workpiece by subjecting the workpiece to a time varying magnetic field that heats the electrically conductive material, thereby heating the workpiece.

10. The method of claim 9, further comprising providing a workpiece formed of a nonmetallic composite material having electrically conductive fibers.

11. The method of claim 10, further comprising providing a workpiece formed of a nonmetallic composite material having electrically conductive graphite fibers.

12. The method of claim 10, further comprising inductively heating the workpiece by subjecting the workpiece to a time varying magnetic field to induce electrical currents in the electrically conductive fibers.

13. The method of claim 9, further comprising positioning the composite material on a die formed of a material substantially transparent to the transmission of an inductive magnetic field and including a forming surface having a shape corresponding to a desired shape for the workpiece.

14. The method of claim 9, further comprising placing a plate formed of a material that is susceptible to inductive heating adjacent the composite material and inductively heating the plate and workpiece by subjecting the plate and workpiece to a time varying magnetic field.

15. The method of claim 9, further comprising producing a pressure differential between first and second sides of the composite material to deform the composite material.

16. The method of claim 9, further comprising placing the composite material on a die that includes electrical conductors that are interconnected into one or more electrically conductive coils surrounding the workpiece.

17. The method of claim 14, further comprising producing a time varying magnetic field in said electrically conductive coils.

18. A method of heating and forming a workpiece formed of a composite material; comprising:

providing a workpiece formed of a nonmetallic composite material including an electrically conductive material;

placing the workpiece on a forming surface of a die formed of a material substantially transparent to the trasnsmission of an inductive magnetic field; and inductively heating the electrically conductive material by subjecting the workpiece to a time varying magnetic field, thereby heating the workpiece.

19. The method of claim 18, further comprise providing a die having one or more electrical conductors embedded within the die and joined to form one or more electrical coils and wherein the method further comprises inductively heating the workpiece by energizing the electrical coils.

* * * * *

UNITED STATES PATENT AND TRADEMARK OFFICE
CERTIFICATE OF CORRECTION

PATENT NO. : 5,571,436
DATED : November 5, 1996
INVENTOR(S) : P.S. Gregg et al.

It is certified that error appears in the above-indentified patent and that said Letters Patent is hereby corrected as shown below:

| COLUMN | LINE | ERROR |
|---|---|---|
| [56] Pg. 2, col. 2 | Refs. Cited (U.S. Pats.) | Insert the following reference: --5,338,497 8/1994 Murray et al.-- |
| [56] Pg. 2, col. 2 | Refs. Cited (U.S. Pats.) | Insert the following reference: --5,313,037 5/1994 Hansen et al.-- |
| [56] Pg. 2, col. 2 | Refs. Cited (U.S. Pats.) | Insert the following reference: 5,313,034 5/1994 Grimm et al.-- |
| [56] Pg. 2, col. 2 | Refs. Cited (U.S. Pats.) | Insert the following reference: --5,283,409 2/1994 Brendel et al.-- |
| 8 (Claim 17, | 9 line 1) | "claim 14" should read --claim 16-- |

Signed and Sealed this

Eleventh Day of March, 1997

Attest:

BRUCE LEHMAN

Attesting Officer     Commissioner of Patents and Trademarks